US006789300B2

(12) United States Patent
Bifrare

(10) Patent No.: US 6,789,300 B2
(45) Date of Patent: Sep. 14, 2004

(54) DUAL EFFECT COMPENSATING TOOL FOR FITTING HANDS

(75) Inventor: Christophe Bifrare, Le Pont (CH)

(73) Assignee: Nouvelle Lemania SA, L'Orient (CH)

( * ) Notice: Subject to any disclaimer, the term of this patent is extended or adjusted under 35 U.S.C. 154(b) by 0 days.

(21) Appl. No.: 10/424,905

(22) Filed: Apr. 29, 2003

(65) Prior Publication Data

US 2003/0200640 A1 Oct. 30, 2003

(30) Foreign Application Priority Data

Apr. 30, 2002 (EP) .......................................... 02076702

(51) Int. Cl.[7] .............................................. B23P 19/04
(52) U.S. Cl. ..................................................... 29/231
(58) Field of Search .................................. 29/231, 251

(56) References Cited

U.S. PATENT DOCUMENTS 829,309 A * 8/1906 Russell ........................ 29/231
837,577 A * 12/1906 Loud ........................... 29/231
2,421,310 A * 5/1947 Berlincourt .................. 29/231
2,613,434 A * 10/1952 Martin ........................ 29/231

FOREIGN PATENT DOCUMENTS

| | | |
|---|---|---|
| CH | 128 510 | 1/1928 |
| CH | 283 492 | 6/1952 |

* cited by examiner

*Primary Examiner*—Robert C. Watson
(74) *Attorney, Agent, or Firm*—Sughrue Mion, PLLC

(57) ABSTRACT

The tool, which can be adapted to a bracket for fitting hands on a dial by driving them in, including a lower rod (11) which slides in a tubular part **(13*a*) of an intermediate cylindrical element (13) compressing a spring (33) abutting against first tension adjustment means (43) and with an overlap that can be checked by a movement indicator (34) for a first force $F_1$, said intermediate cylindrical element (13) itself sliding in the upper tube (15) compressing a second spring (35) abutting against second tension adjustment means (45) and with an overlap that can be checked by a movement indicator (36)** for a second force $F_2$.

9 Claims, 3 Drawing Sheets

Fig.2bis
PRIOR ART

DUAL EFFECT COMPENSATING TOOL FOR FITTING HANDS

The present invention concerns a dual effect compensating tool for fitting hands, particularly for the hands of a clockwork movement. "Dual effect" means the possibility of controlling the minimum and the maximum driving force of the hands onto their shafts, as will be explained in more detail hereinafter.

FIGS. 1 and 2 show in a way the history of fitting hands on a dial, in particular on the dial of a clockwork movement.

Reference 4 of FIG. 1 shows schematically the oldest manual method. After positioning the hole of a hand above its tool an operator drives it in by means of a rod 41. The proper positioning of a hand, parallel to the dial and along its vertical axis, so that the hands do not catch on each other and do not rub against the dial, thus depends solely on the experience and dexterity of the operator. This method is still used for very small production or for repairs.

FIG. 2 shows an apparatus 5, called a "Bergeon" bracket, well known in the horological field, comprising a frame 6, provided with a plate 7 for receiving a clockwork movement, said frame 6 supporting a column 8, on which a vertical tool-carrier 9 is mounted, in which three different tools 1, 2 and 3 have been placed, reference 1 corresponding to the tool according to the invention that is described in more detail hereinafter. Each tool includes at one end a detachable stake 37, 27 or 17 adapted to each type of hand, and at the other end a head 38, 28 or 18 on which the driving force will be exerted. Micrometric screws 30, 20, 10 screwed into tool carrier 9 enable the travel of each tool to be adjusted. Tool carrier 9 is pivoted on a tool 8*a* of column 8 to bring a category of tools 1, 2 or 3 into the axis of plate 7. These tools allow the hour, minute and chronograph hands to be driven in successively in a known manner via stake 17, and minute, hour and small second hand counters via a bent stake, offset with respect to the centre of the movement. These tools are held in the high position by means of springs 12, 22 or 32 arranged between a through hole of micrometric screws 30, 20 or 10 and heads 38, 28 or 18, or subjacent washers 12*a* or 22*a*. In the low position, the distance of each stake 17, 27 or 37, screwed into rods or tubes 11, 21 or 32, with respect to plate 7 is adjusted by means of micrometric screws 10, 20 or 30 of frame 5. The head of each tool includes a push-button 18, 28 or 38 on which an operator will exert pressure to drive in a hand.

As will be seen, tool 3 which has just been entirely described, guarantees, with a Bergeon bracket, the verticality of the fitting, whether or not the tool is correctly driven, i.e. neither too tight is properly driven in, i.e. neither too tight nor too loose on its staff, still depends on the skill of the operator, and more precisely his touch sensitivity at the start of driving in the hand. There are, however, three possibilities:

- "too great" a resistance means that the hand hole is too small and that the hole will have to be squared up before trying to drive the hand in again; increasing the force used to drive it in would risk damaging or offsetting the subjacent gears;
- an absence of resistance means that the hand hole is too big and that the latter will have to be discorded; and
- "small" resistance means that the hand has been driven in properly.

The tool corresponding to reference 2 allows the first possibility to be checked visually in order not to exceed a predetermined maximum force fixed by bearings. Indeed, tube 21 slides in a tube 25 containing a spring (not visible in FIG. 2) compressed by a piston 24 that can be manoeuvred from the exterior via push-button 28. As can be seen in FIG. 2*b* is, piston 25 includes perpendicular to its axis a tool 24*a* which can be moved in an aperture of tube 25 to occupy five different positions, i.e. by compressing the spring to define five maximum force values for example by 500 g stops. In order to carry out the visual check, tube 25 includes close to its base an oblong hole 26, in which a maximum force exceeding indicator 29 can move. In other words, washer 22*a* has to press against micrometric screw 20 without any movement of indicator 29 being observed during this operation.

A tool of this kind, available for example from Sandoz Fils & Co (La Chaux-de-Fonds, Switzerland) does not however allow the maximum force that must not be exceeded to be precisely adjusted, and especially gives no indication as to the minimum force that has to be reached to drive the hand in properly.

It is thus an object of the present invention to overcome the drawbacks of the prior art by providing a dual effect compensating tool which allows a visual control of both the maximum force and minimum force and which allows the intensity of the force to be precisely adjusted.

Therefore the insert invention concerns a dual effect compensating tool, adaptable to a bracket for fitting hands onto a dial by driving them in. The bracket includes, in the usual manner, a frame connected by a column to a pivoting tool carrier capable of receiving three tools whose height can be adjusted to fit successively the hour, minute and chronograph hands, or hour, minute and small second hand counters. Each tool is characterised in that it includes three parts that flap over each other in a way that can be visually checked. Each tool includes, at its base a stake, adapted to each type of hand, screwed into a lower rod that slides in a tubular part of an intermediate cylindrical element whose other end also slides in a tube at the end of which there is screwed a head on which a force F will be exerted. A first spring, that is determinant for a first force $F_1$, placed in the tubular part of the intermediate element, is compressed between the lower rod into which a first movement indicator is screwed passing through the wall of the intermediate element through an oblong hole, and a first means for adjusting the spring tension formed by a screw and lock-screw device placed inside the intermediate element. Likewise, a second spring, that is determinant for a second force $F_2$, placed in the upper tube, is compressed between the end of the intermediate element, into which a second movement indicator is screwed, passing through an oblong hole of the upper tube, and a second adjustment means, identical to the first and located at the end of the upper tube. These indicators, preferably formed by screws allowing the adjustment means to be dismantled and adjusted, allow, via their movement in the oblong holes, the force F applied to the head to be evaluated with respect to force $F_1$, which is for example the minimum driving force that has to be reached, and with respect to force $F_2$, which is for example the maximum force that must not be exceeded.

Other features and advantages of the present invention will appear more clearly upon reading the following description of a preferred embodiment, with reference to the annexed drawings, in which.

Figure 3:
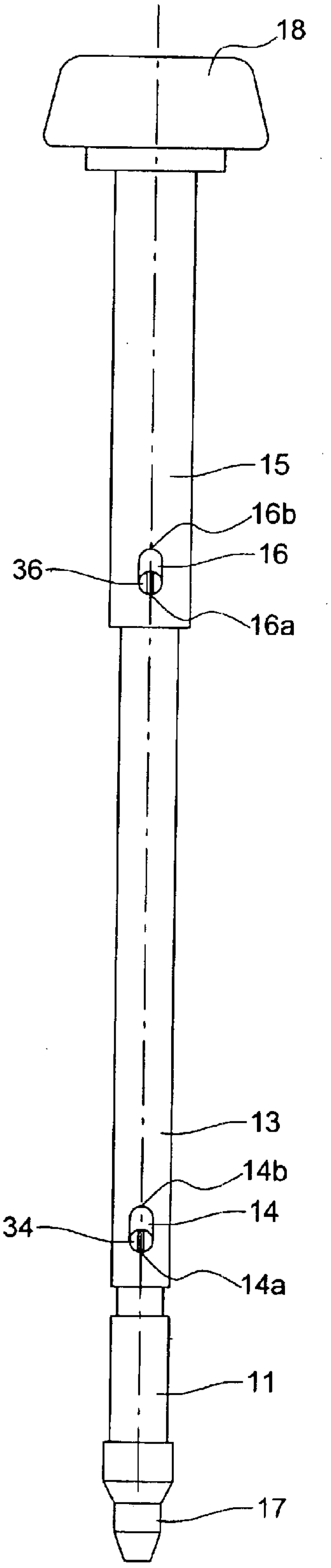
Figure 4:
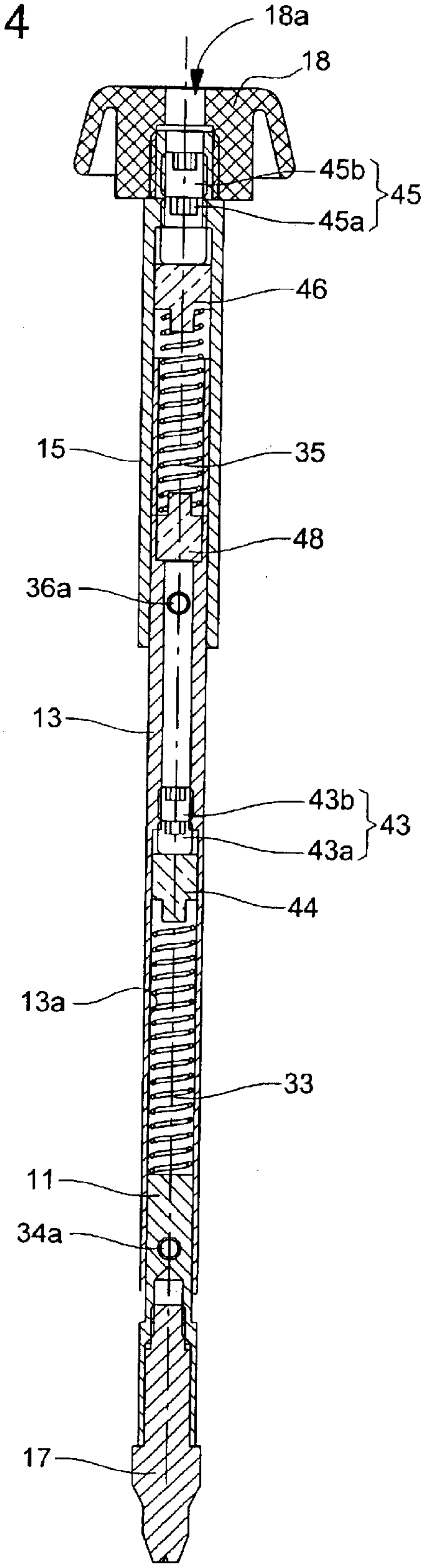
Figure 5:
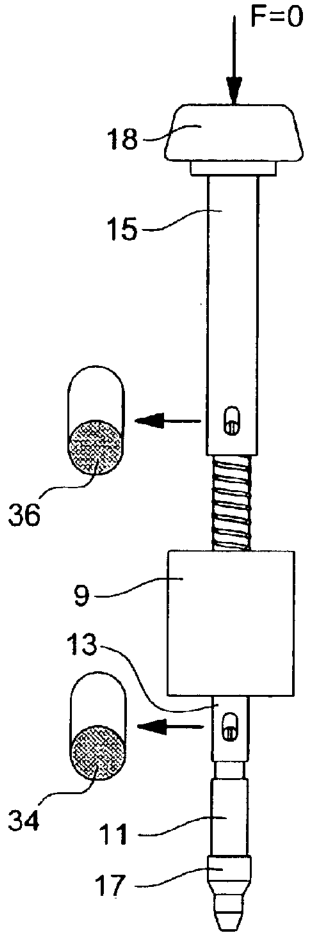
Figure 6:
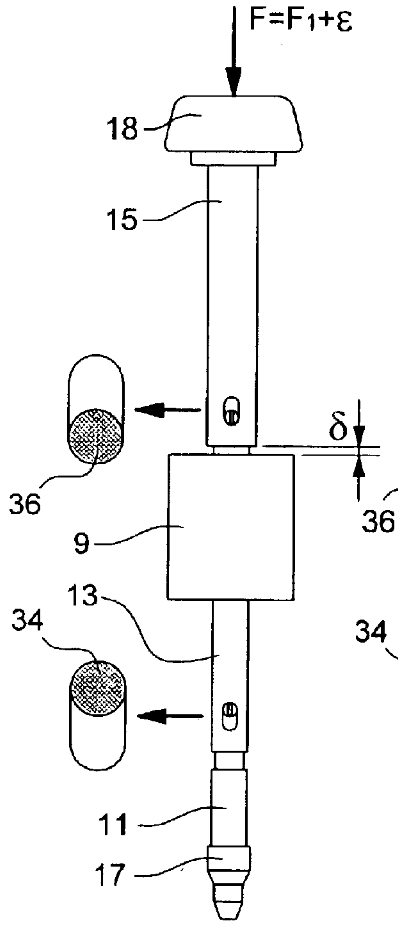
Figure 7:
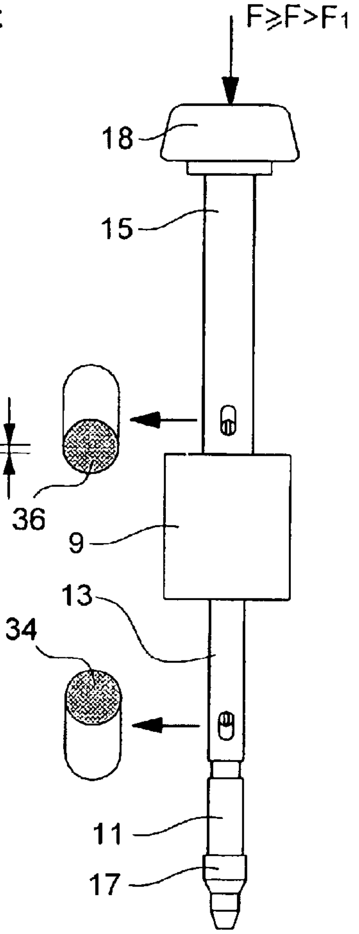
Figure 8:
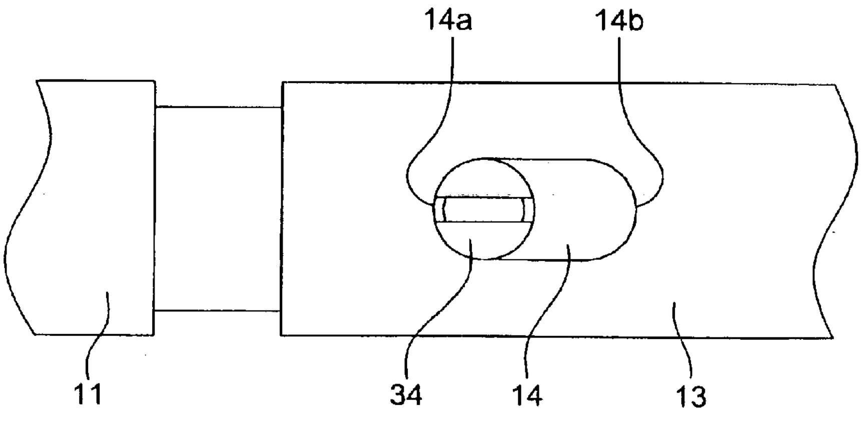

FIG. 2*b* is an enlarged representation of a portion or a tool according to the prior art;

FIGS. 3 and 4 respectively show a front view and a longitudinal cross-section of a tool according to the invention;

FIGS. 5, 6 and 7 show three different positions of the tool according to the invention during the driving operation; and FIG. 8 is an enlarged diagram of the minimum force indicator.

Figure 1:
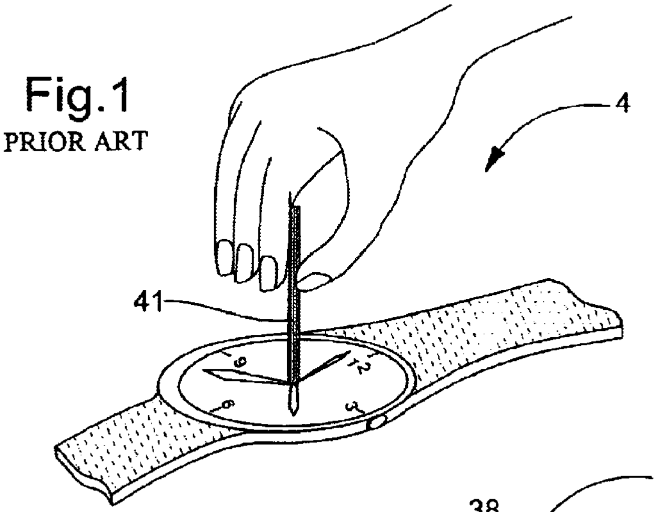
Fig.1 PRIOR ART
FIG. 1 shows a method for fitting hands according to the prior art.
Figure 2:
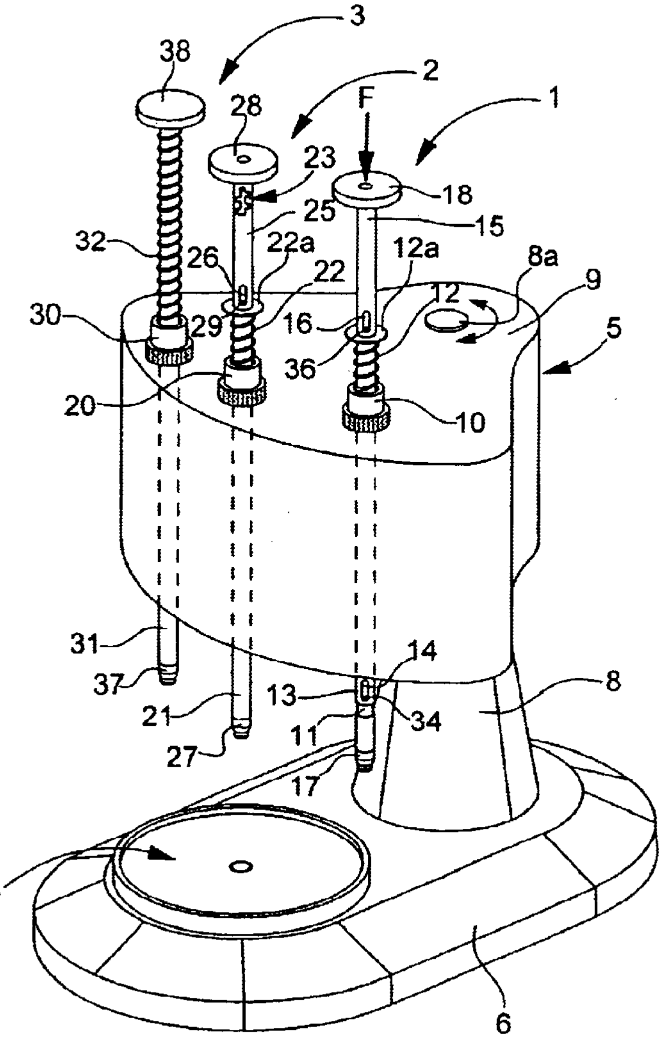
FIG. 2 shows a bracket supporting two tools for fitting hands according to the prior art and a tool according to the invention.
Figure 2:
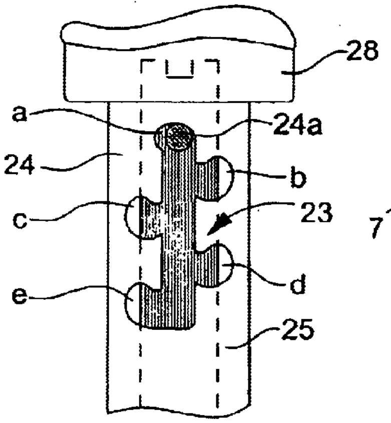

Since FIGS. 1, 2 and 2*b* is (tools referenced 2 and 3) were described in the preamble as representatives of the prior art they will not be described further, and a preferred embodiment of a dual effect compensating tool according to the invention corresponding to the reference 1 of FIG. 2 and shown in larger scale in FIGS. 3, 4 and 8 will be described hereinafter.

It will be indicated first of all that the control of a minimum driving force is of great importance in horological construction, and particularly in so-called "flyback" chronograph watches. In such watches the chronograph hand returns very quickly to zero when the chronograph mode is switched on, such that the hand moves back immediately. The time reference of a new chronograph start can be exceeded if the hand is driven in too loosely, which obviously disrupts the accuracy of the next measurement. In more ordinary watches, where the second hand is above all an indicator of that the watch is working properly, it is however disagreeable to have the impression that this hand "struggles" to move forward. The tool according to the invention thus guarantees that the hand has been driven in properly with sufficient tightening to avoid the aforementioned drawbacks.

The tool shown in FIGS. 3 and 4 has three main parts: a lower rod 11 one end of which includes an inner threading allowing an interchangeable stake 17 to be screwed in for each type of hand, an intermediate cylindrical element 13 and an upper tube 15 onto which a head 18 is screwed, allowing a force F to be exerted on the tool when the latter is adjusted on a bracket 5. Lower rod 11 slides in a tubular part 13*a* of the intermediate cylindrical element 13 with a limited axial clearance between two end positions marked by an indicator member 34 formed by a screw, screwed into a threaded hole 34*a* of the solid part of lower rod 11, and whose head is flush with the outer opening of an oblong hole 14 formed through wall 13*a* of intermediate cylindrical element 13. Lower rod 11 compresses a helical spring 33, against means 43 for adjusting the tension of said spring 33, formed by a screw 43*a* and a lock-screw 43*b* whose heads, in the example shown, are accessible through the other end of intermediate element 13 which then also has a tubular part in the extension of tubular part 13*a*. If one chooses to have this same end solid, it is clear that one need only orient adjustment means 43 in the opposite direction such that the heads of screws and check screws 43*a*, 43*b* are accessible through tubular part 13*a*. As can be seen, a small piston 44 inserted between adjustment means 43 and spring 44 allows said spring to be centred. As can be seen more clearly in FIG. 8, in the absence of any force F exerted on head 18, indicator 34 occupies a low position 14*a* in oblong hole 14. When a force F greater than a force $F_1$ is exerted, depending upon the features of spring 33 and the adjustment made at adjustment means 43, indicator 34 will move to a high position 14*b* of oblong hole 14, which thus allows a visual check to be carried out of any exceeding of force $F_1$ during the driving operation. Force $F_1$ corresponds, for example, to a minimum force that has to be exceeded in order to ensure sufficient tightening of a hand on its shaft. The characteristic features of spring 33 and adjustment means 43 allow, for example, minimum force $F_1$ to be adjusted between 500 g and 1000 g, preferably between 800 g and 900 g, depending upon the specifications of the movement concerned.

According to a quite comparable principle, intermediate element 13 cooperates with upper tube 15 to define a second force $F_2$ which will in this case be a maximum force, which could for example be chosen to be between 1000 g and 4000 g, preferably between 1500 g and 3500 g, depending upon the specifications of the movement concerned. Cylindrical element 13 slides in upper tube 15 with a limited flaptool g between two end positions marked by an indicator member 36 formed by a screw, screwed into a threaded hole 36*a* of intermediate element 13, whose head is flush with the outer opening of an oblong 16 formed through upper tube 15. Intermediate cylindrical element 13 compresses a spring 35 against tension adjustment means 45. These adjustment means 45 are formed of a screw 45*a* and a lock-screw 45*b* whose heads are accessible through an opening 18*a* of the head. As previously, a small centring piston 46 can be inserted between spring 35 and adjustment means 45. It is also possible to provide another small centring piston 48 at the other end of the spring.

Thus, when the force F exerted on head 18 is greater than force $F_2$, indicator 36 passes from a low position 16*a* to a high position 16*b*.

FIGS. 5, 6 and 7 show schematically how the dual effect compensating tool allows a visual check to be carried out on the minimum driving force $F_1$ and on the maximum driving force $F_2$.

In FIG. 5, no force is exerted on head 18 ($F_1$=0) and the two indicators 34, 36 occupy a low position.

In FIG. 6, a force F is exerted on head 18 until the stake is brought into contact with the hand concerned. The hand does not have to descend yet, i.e. oppose a resistance ($F=F_1+\epsilon$) such that indicator 34 passes into the high position without driving having started, indicator 36 remaining in the low position. If, during this phase indicator 34 stayed in the low position, this would mean that the hand is defective (hole too big) and that it will have to be replaced.

In FIG. 7, force F is increased ($F>F_2$) and the hand has to start to descend without indicator 36 passing into the high position ($F\leqq F_2$). Indeed, if indicator 36 passes into the high position this means that the force is too great ($F>F_2$) and that the hand is defective (hole too small) and that it will have to be replaced in order to be squared. If this "alarm signal" were not respected, there would be a further risk of the hand height being incorrect.

The tool that has just been described thus allows a rigorous check to be carried out on a predetermined minimum force and maximum force to ensure a high quality hand-fitting. Modifications within the grasp of those skilled in the art can be carried out without departing from the scope of the present invention.

What is claimed is:

1. A dual effect compensating tool, able to be adapted to a bracket for fitting hands on the dial of a movement by driving them in, including at its base a stake screwed into a lower rod, and at its other end an upper tube onto which a head is screwed, allowing forces, checked by movement indicators, to be exerted, wherein the lower rod slides in a tubular part of an intermediate cylindrical element compressing a first spring abutting against first tension adjustment means and with an axial clearance that can be checked by a first movement indicator for a first force $F_1$, said intermediate cylindrical element itself sliding in the upper tube compressing a second spring abutting against second tension adjustment means and with an axial clearance able to be checked by a second movement indicator for a second force $F_2$.

2. A compensating tool according to claim 1, wherein the first and second tension adjustment means are formed by devices with screws and lock-screws arranged respectively in the tubular part of the intermediate cylindrical element and in the upper tube in proximity to the head.

3. A compensating tool according to claim 2, wherein the head includes a through passage for acting on the second adjustment means.

4. A compensating tool according to claim 2, wherein the intermediate cylindrical element has a tubular part extending over its entire length allowing the first adjustment means to be acted on from the opposite side to the tubular part into which the lower rod slides.

5. A compensating tool according to claim 1, wherein a small centring piston of the second spring is inserted between the end of the intermediate element and said spring.

6. A compensating tool according to claim 2, wherein small centring pistons of the springs are inserted between the adjustment means and said springs.

7. A compensating tool according to claim 1, wherein each movement indicator for a force $F_1$ or $F_2$ is formed by a screw, respectively fixed in the upper part of the lower rod and in the upper part of the intermediate cylindrical element, said screw passing through an oblong hole respectively formed in the lower part of the intermediate cylindrical element and in the lower part of the upper tube, the movement indicators occupying a low position in the oblong holes when no force F is applied.

8. A compensating tool according to claim 1, wherein the springs and the adjustment means are selected such that the force $F_1$ is the minimum force that has to be exceeded at the start of driving in the hands and the force $F_2$ is the maximum force that must not be exceeded at the end of the driving in operation.

9. A compensating tool according to claim 1, wherein the adjustment means allow the minimum force $F_1$ to be adjusted to any value comprised between 500 g and 1000 g, preferably between 800 g and 900 g, and the maximum force to be adjusted to any value comprised between 1000 g and 4000 g, preferably between 1500 g and 3500 g.

* * * * *